Sept. 26, 1961  A. D. KOMPELIEN  3,002,094
ELECTRIC APPARATUS
Filed Oct. 5, 1959
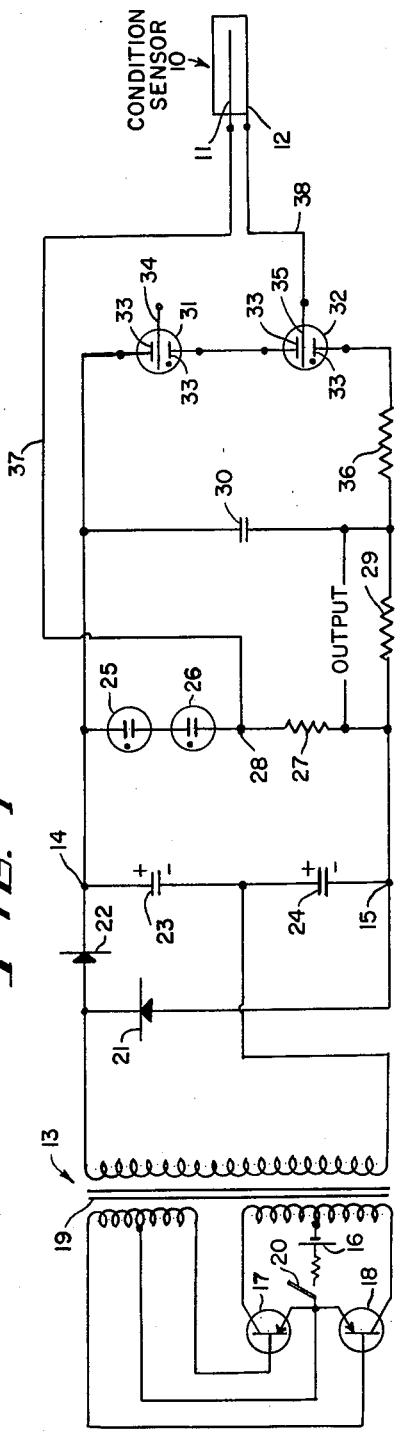
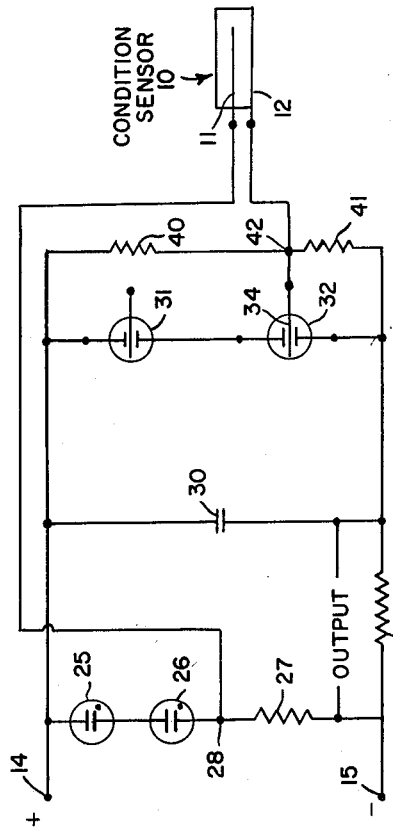
INVENTOR.
ARLON D. KOMPELIEN
BY
ATTORNEY United States Patent Office 3,002,094
Patented Sept. 26, 1961

3,002,094
ELECTRIC APPARATUS
Arlon D. Kompelien, Minneapolis, Minn., assignor to Minneapolis-Honeywell Regulator Company, Minneapolis, Minn., a corporation of Delaware
Filed Oct. 5, 1959, Ser. No. 844,467
9 Claims. (Cl. 250—83.6)

The present invention is concerned with an improved electric apparatus and particularly with an electric apparatus adapted for use with a nonselfquenching condition sensor of the type having a pair of electrodes disposed in an ionizable gaseous medium.

A condition sensor of this type, of which a Geiger tube is an example, is a normally nonconducting device which, upon being subject to a condition to which it is sensitive, responds to this condition such that the gas fill within the condition sensor is ionized and an electrical current is allowed to flow between the electrodes thereof. The nonselfquenching condition sensor remains conductive, once it is placed in a conducting state, until such time as the operating voltage applied to the electrodes thereof is reduced to at least the extinction or quenching potential of the condition sensor. The circuit means which cooperates with this type of condition sensor must therefore not only supply operating voltage to the electrodes of the condition sensor, and must also sense the ionization of the condition sensor to then quench the sensor.

The improved electric apparatus of the present invention is specifically constructed to do this with a minimum of cost. Furthermore, the apparatus of the present invention lends itself particularly to a portable apparatus since the apparatus utilizes neon tubes, or more broadly, gas filled devices which consume very small quantities of energy from a source of operating voltage. By the use of neon tubes, it is possible to construct a reliable and yet a low cost and light weight condition sensing apparatus which operates reliably for a considerable length of time from batteries having a limited amount of energy available.

Specifically, the present invention utilizes a controllable neon tube, that is one having a pair of main current conducting electrodes as well as a starting electrode. The condition sensor has one electrode thereof connected to the control electrode of the neon tube and the condition sensor is effective to control the neon tube in accordance with the condition to which the condition sensor is subjected. Upon the condition sensor being subjected to a condition to which it is sensitive, the neon tube is rendered conductive and as a result thereof the potential level of its control electrode is appreciably altered and has the effect of reducing the operating voltage for the condition sensor to the point where the condition sensor is quenched.

The present invention will be apparent to those skilled in the art upon reference to the following specification, claims, and drawings, of which:

FIGURE 1 is a schematic representation of a first embodiment of the present invention, and
FIGURE 2 is a schematic representation of a second embodiment of the present invention.

FIGURE 1

Referring now specifically to FIGURE 1, the reference numeral 10 identifies a condition sensor having a first electrode 11 and a second electrode 12 disposed in an ionizable gas. As has been mentioned, condition sensor 10 may be of the Geiger tube type in which case the electrode 11 constitutes an anode and the electrode 12 constitutes a cathode. The condition sensor 10 is normally in a nonconducting condition and it is effective upon being subjected to a condition to which it is sensitive, to pass electrical current between the electrodes 11 and 12, this occurring due to ionization of the gas in which these electrodes are disposed. The particular type of condition sensor with which the present invention is adapted to be used in the nonselfquenching type which, once it is placed in a current conducting condition, remains in this condition until such time as the tube is quenched. This is normally accomplished by means which reduces the operating voltage of the condition sensor to a point where the gas within the tube is deionized or quenched.

The reference numeral 13 identifies a source of operating voltage in the form of a power supply having a positive output terminal 14 and a negative output terminal 15. The specific power supply disclosed utilizes a low voltage battery 16 which is connected in circuit with a pair of transistors 17 and 18 and a transformer 19 to form a conventional transistor oscillator, under the control of an on-off switch 20, the switch 20 being shown in its off position in FIGURE 1. The secondary of transformer 19 is connected to a voltage doubling network including diodes 21 and 22 and capacitors 23 and 24. The specific form of power supply which is shown in FIGURE 1 is an ideal type for a portable condition sensing apparatus since a light weight and low voltage battery 16 is utilized and the compact transistor oscillator is effective through the expedient of a step-up transformer and a voltage doubling network to provide a relatively high magnitude D.C. voltage at the terminals 14 and 15. As will be apparent from the following description, as a result of the present invention it is possible to utilize a low voltage battery having relatively limited quantities of energy in conjunction with the improved circuit to quench the condition sensor 10.

The improved circuit consists of a number of electrical components including neon tubes. These neon tubes require very little electrical energy for their operation, and in fact when these tubes are in a nonconducting condition no electrical energy is required. On the other hand circuits utilizing hot cathode type discharge devices require considerable electrical energy, even when they are nonconductive. The reference numerals 25 and 26 identify two series connected neon tubes. These neon tubes are connected in series with a resistor 27 and this series circuit is connected to terminals 14 and 15 to apply a voltage thereto. The magnitude of the voltage present across the terminals 14 and 15 is such that the neon tubes 25 and 26 are normally in a conducting condition. Therefore, the means 25—27 constitutes a voltage dividing means in which the intermediate terminal 28 lies at potential level which is intermediate the potential level of terminals 14 and 15.

Terminals 14 and 15 of power supply 13 are also connected to series connected resistor 29 and capacitor 30. Therefore, capacitor 30 is adapted to be charged through resistor 29 and after a short time period, the voltage present across capacitor 30 is approximately equal to that present at terminals 14 and 15.

The reference numerals 31 and 32 identify a further pair of neon tubes which differ from the tubes 25 and 26 in that the tubes 31 and 32 are a type which can be controlled by means of a control electrode. Each of these tubes includes main current conducting electrodes identified by the reference numeral 33. Also, the reference numerals 34 and 35 identify the control electrodes of the tubes 31 and 32 respectively. These tubes, which are connected in series, are connected in series with a further resistor 36 and the series circuit 31, 32, and 36 is connected in parallel with capacitor 30. The breakdown voltage of neon tubes 31 and 32 is such that these tubes remain nonconductive until a control signal is applied to the control electrode 35 of neon tube 32. In the specific embodiment shown, two tubes are utilized in series since the voltage present across capacitor 30 is such as would normally render one of these neon tubes conductive. However, with two of the tubes in series, they both remain nonconductive.

As has been mentioned, terminal 28 of voltage dividing means 25—27 lies at an intermediate potential level with respect to the potential level of the terminals 14 and 15. The potential level of terminal 28 is however positive with respect to that of terminal 15. This positive terminal 28 is connected by means of a conductor 37 to electrode 11 of condition sensor 10. The electrode 12 of condition sensor 10 is connected by means of a conductor 38 to the control electrode 35 of neon tube 32. Since the neon tubes 31 and 32 are in a nonconducting condition, the impedance from control electrode 35 through neon tube 31 to terminal 14 is very high compared to the impedance from the control electrode 35 through resistor 36 to the lower plate of capacitor 30. Since capacitor 30 is charged to approximately the voltage existing between terminals 14 and 15, the lower plate of this capacitor lies at approximately the same potential level as terminal 15 and therefore it can be said that electrode 12 of condition sensor 10 lies only slightly above the potential level of terminal 15. Therefore, a large percentage of the voltage existing between terminals 28 and 15 is applied as an operating voltage to the electrodes 11 and 12 of condition sensor 10. In the event that the condition sensor 10 is a Geiger tube, then the anode 11 is connected to a positive terminal and the cathode 12 is connected to a negative voltage. In a specific embodiment of the present invention, the voltage present between terminals 14 and 15 was 460 volts. The neon tubes 25 and 26 were the type NE2 neon tubes while the resistor 27 was a 10 megohm resistor. The voltage present across resistor 27 was approximately 350 volts. Furthermore resistor 29 had a value of 3.3 megohms while resistor 36 had a value of 10,000 ohms. Capacitor 30 had a value of .002 microfarad. The neon tubes 31 and 32 were the type NE77 neon tubes.

Referring now to the operation of the apparatus of FIGURE 1, assume that switch 20 is placed in the on position, which then connects battery 16 in circuit with transistors 17 and 18. Capacitors 23 and 24 are now charged to the polarity shown in FIGURE 1 and as a result a positive voltage is supplied at terminal 14 with respect to terminal 15. This voltage is sufficient to cause the neon tubes 25 and 26 to conduct and these tubes, in conjunction with resistor 27, cause a voltage to appear thereacross which places the intermediate terminal 28 at a potential level intermediate the potential level of terminals 14 and 15 but at a pontential which is positive with respect to terminal 15. Furthermore, capacitor 30 charges through resistor 29 to approximately the full voltage present between terminals 14 and 15.

The neon tubes 31 and 32 do not however become conductive at this time because of the firing characteristics of these tubes, which characteristics require a higher voltage across the main electrodes than is now present. However, these tubes may be rendered conductive by means of a signal applied to control electrode 35. This signal is derived from the condition sensor 10.

Assume now that an ionizing event, which is indicative of the condition to which the condition sensor 10 is subjected, passes through the condition sensor and ionizes the gas thereof. A pulse of current now flows between electrodes 11 and 12 and this pulse of current can be traced from the upper plate of capacitor 30, neon tubes 25 and 26, conductor 37, condition sensor 10, conductor 38, the control electrode 35 and the main current conducting electrode 33 of neon tube 32, and resistor 36 to the lower plate of capacitor 30. This current flow which exists between the control electrode 35 and the main current conducting electrode 33 of neon tube 32 is effective to cause the gas within neon tube 32 to ionize and therefore this tube becomes conductive between its main current conducting electrodes identified by the reference numeral 33. The impedance between these main current conducting electrodes therefore becomes very low and a higher voltage is now applied between the main current conducting electrodes 33 of neon tube 31. This high voltage is effective to cause the neon tube 31 to conduct between its main current conducting electrodes and a current flow circuit can now be traced from the upper plate of capacitor 30 through neon tube 31, neon tube 32 and resistor 36 to the lower plate of capacitor 30. One of the functions of resistor 36 is to limit the current which flows as capacitor 33 is initially short circuited through neon tubes 31 and 32. Another function is to maintain tubes 31 and 32 ionized as capacitor 30 discharges over a time period, to thereby maintain a low voltage at sensor 10 for a given period.

As capacitor 30 quickly discharges, the potential level of its lower plate, to which the electrode 12 of condition sensor 10 is connected, assumes substantially the same potential as its upper plate which is connected to terminal 14. The voltage present across the series connected neon tubes 31 and 32 is now appreciably reduced and these neon tubes again become nonconductive. Also, the potential of electrode 12 suddenly moves in a positive direction and the voltage present between the electrodes 11 and 12 is substantially altered such that the gas within the condition sensor 10 deionizes and the tube is quenched. Once the tube is quenched, an operating voltage must again be applied to electrodes 11 and 12 before the condition sensor 10 may respond to a further ionizing event. This reapplication of operating voltage to the electrodes of condition sensor 10 is delayed since, before this operating voltage can be applied to these electrodes, capacitor 30 must recharge through resistor 29.

During this recharging process, the entire voltage between terminals 14 and 15 is initially developed across resistor 29. Gradually, capacitor 30 charges and the voltage present across resistor 29 is reduced until such time as capacitor 30 is substantially completely charged to the voltage existing between terminals 14 and 15. However, during this charging time the voltage developed across resistor 29 subtracts from the voltage present across resistor 27. Therefore, an operating voltage is not reapplied to the condition sensor 10 until capacitor 30 is substantially completely recharged. This then insures that condition sensor 10, and particularly the gas therein, becomes completely deionized prior to the application of an operating voltage to the electrodes thereof.

For purposes of simplicity, the output has been shown as taken across resistor 29. It is recognized that in the event that condition sensor 10 is a Geiger tube type of a condition sensor, certain inherent background counts are present in the absence of the condition to which the Geiger tube is sensitive. The entire apparatus of FIGURE 1 may constitute a fire detection system which is portable and is adapted to be placed in operation and then left unattended in an area to be supervised by the Geiger tube. However, the Geiger tube is subjected to inherent background counts, these being stray ionizing events which at a random and infrequent interval causes the Geiger tube to become conductive. On the other hand, the presence of a fire in the area causes a frequent and steady counting rate or periods of ionization and deionization of the Geiger tube and it may be desirable to connect means such as an integrating means in the output to discriminate against the background count of the Geiger tube. With the use of such a means, the ultimate output is actuated only upon the integrating network receiving sustained and frequent counts from the Geiger tube.

FIGURE 2

The apparatus of FIGURE 2 is similar to the apparatus of FIGURE 1 in that the operating voltage for the condition sensor 10 is derived from terminal 28, which is an intermediate terminal of voltage divider 26—27. Furthermore, a capacitor 30 is provided which is charged from terminals 14 and 15 through a resistor 29. In the apparatus of FIGURE 2, resistor 36 has been eliminated and the series connected neon tubes 31 and 32 are directly connected in parallel with capacitor 30. A further voltage divider including resistors 40 and 41 is connected across the terminals 14 and 15 and an intermediate point 42 on this further voltage divider is connected to the control electrode 34 of the neon tube 32.

The operation of the apparatus of FIGURE 2 is similar to the operation of the apparatus of FIGURE 1. Normally, neon tubes 25 and 26 are conductive and terminal 28 is therefore rendered positive with respect to terminal 15. Furthermore, capacitor 30 charges through resistor 29 to approximately the full voltage existing between terminals 14 and 15. The voltage present across capacitor 30 is however insufficient to cause neon tubes 31 and 32 to become conductive. The intermediate point 42 on the voltage divider 40—41 establishes the operating potential level of both electrode 12 of condition sensor 10 and of control electrode 34 of neon tube 32. The voltage present across the voltage divider 40—41 is derived from capacitor 30 and upon the condition sensor 10 being subjected to an ionizing condition, neon tubes 31 and 32 are rendered conductive, neon tube 32 being the first to be rendered conductive and then neon tube 31 being rendered conductive. Capacitor 30 discharges with this capacitor discharged, substantially no voltage is present across resistors 40 and 41. Therefore, the electrode 12 of condition sensor 10 is effectively connected to the terminal 14 of the power supply means. In this manner, condition sensor 10 is quenched.

Condition sensor 10 becomes nonconductive and neon tubes 31 and 32 also become nonconductive due to the fact that the voltage or electrical energy present at capacitor 30 has now been dissipated. An operating voltage is not reapplied to condition sensor 10 until such time as capacitor 30 has recharged through resistor 29, much in the manner above described in connection with FIGURE 1. This then allows a certain time period during which the gas within the condition sensor 10 may completely deionize. After this time period however, capacitor 30 is again charged and an operating voltage is again applied to the electrodes of the condition sensor, once again rendering sensor 10 operative to sense the condition to which it is sensitive.

From the above description it can be seen that I have provided a relatively simple apparatus for use with a condition sensor having a pair of electrodes disposed in an ionizable gaseous medium (for example a Geiger tube) in which only small quantities of electrical energy are required since the circuit utilizes current conducting devices of the controllable neon tube type. While FIGURES 1 and 2 disclose preferred embodiments of the present invention, it is recognized that the scope of the present invention is not limited thereto and it is therefore intended that the scope of the present invention be defined by the scope of the appended claims.

I claim as my invention:

1. Electric apparatus for use with a normally nonconductive nonselfquenching condition sensor of the type having a pair of electrodes disposed in an ionizable gaseous medium and arranged when subjected to an ionizing condition to conduct electrical current between the electrodes until the operating voltage applied thereto is substantially reduced, the apparatus comprising; a source of operating voltage, a normally conducting voltage divider connected to said source of voltage, circuit means including an intermediate terminal on said normally conducting voltage divider adapted to be connected to one electrode of the condition sensor, a second voltage divider connected to said source of voltage and having a normally nonconducting gas tube including a control electrode, and circuit means including a further terminal connected to said control electrode and adapted to be connected to the other electrode of the condition sensor, the potential difference between said intermediate and said further terminals being sufficient to apply an operating voltage to the electrodes of the condition sensor, and the condition sensor being effective upon being subjected to a condition to which it is sensitive to render said gas tube conductive and thereby alter the potential level of said further terminal and substantially reduce the voltage applied to the electrodes of the condition sensor.

2. Electric apparatus comprising; a source of voltage, a first and a second series connected impedance connected to said source of voltage to thereby establish a voltage at the junction of said first and second impedance, a third impedance, a normally nonconducting gas tube having a pair of main electrodes and a control electrode, circuit means connecting the main electrodes of said gas tube and said third impedance in series to said source of voltage, a normally nonconductive nonselfquenching condition sensor having a pair of electrodes, said condition sensor being rendered conductive upon being subjected to a condition to which it is sensitive, and means connecting the electrodes of said condition sensor to the junction of said first and second impedances and to the control electrode of said gas tube, said condition sensor being effective upon being subjected to a condition to which it is sensitive to cause said gas tube to become conductive.

3. Electric apparatus comprising; a nonselfquenching Geiger tube having a pair of electrodes, a voltage regulating gas tube, a first impedance, a source of voltage, circuit means connecting said voltage regulating gas tube and said first impedance in a series circuit to said source of voltage, a second impedance, a normally nonconductive gas tube having a control electrode and a pair of main electrodes, circuit means connecting said pair of main electrodes and said second impedance in a series circuit to said source of voltage, circuit means connecting one electrode of said Geiger tube to the junction of said voltage regulating gas tube and said first impedance, and further circuit means connecting the other electrode of said Geiger tube to the control electrode of said nonconductive gas tube to thereby apply an operating voltage to said Geiger tube, said Geiger tube being effective upon being subjected to a condition to which it is sensitive to render said nonconductive gas tube conductive to thereby alter the potential level of said control electrode to quench said Geiger tube.

4. Electric apparatus comprising; nonselfquenching Geiger tube type condition sensing means, a source of operating voltage having a pair of terminals, a voltage divider having an intermediate terminal, circuit means connecting said voltage divider to said pair of terminals, a series connected capacitor and resistor, circuit means connecting said series connected capacitor and resistor to said pair of terminals, a normally nonconducting gas tube having a pair of main electrodes and a control electrode, circuit means connecting the main electrodes of said gas tube in parallel with said capacitor, and further circuit means connecting the electrodes of said Geiger tube to said intermediate terminal of said voltage divider and to the control electrode of said gas tube to thereby apply an operating voltage to said Geiger tube, said Geiger tube upon being subjected to a condition to which it is sensitive being effective to render said gas tube conductive and thereby discharge said capacitor, whereupon the operating voltage of said Geiger tube is reduced to the quenching voltage thereof.

5. Electric apparatus comprising; a nonselfquenching condition sensor of the type having a pair of electrodes disposed in an ionizable gaseous medium, said condition sensor being effective upon being subjected to a condition to which it is sensitive to pass electrical current between the electrodes thereof until the operating voltage applied to the electrodes is reduced to the extinction potential of the condition sensor, a source of operating voltage having a pair of output terminals and an intermediate terminal disposed at a potential level intermediate the two output terminals, a series connected capacitor and resistor, circuit means connecting said series connected capacitor and resistor to said pair of output terminals, a normally nonconducting gaseous discharge device having a pair of main electrodes and a control electrode, circuit means connecting said pair of main electrodes in parallel with said capacitor, and further circuit means connecting the electrodes of said condition sensor to the intermediate terminal of said source of voltage and to the control electrode of said gaseous discharge device to thereby apply an operating voltage to said condition sensor, said condition sensor being effective upon being subjected to the condition to which it is sensitive to cause said gas tube to become conductive and thereby discharge said capacitor, whereupon the operating voltage applied to the electrodes of said condition sensor is reduced to the extinction potential thereof.

6. Electric apparatus comprising: a nonselfquenching condition sensor of the type having a pair of electrodes disposed in an ionizable gaseous medium, a source of operating voltage having a pair of output terminals, a series connected voltage regulating neon tube and first resistor, circuit means connecting said series connected neon tube and first resistor to said output terminals to thereby establish an intermediate potential level at the junction of said voltage regulating neon tube and said first resistor, a series connected capacitor and second resistor connected to said output terminals, a third resistor, a normally nonconducting neon tube having a control electrode, circuit means connecting said normally nonconducting tube and said third resistor in series to the terminals of said capacitor, and circuit means connecting the electrodes of said condition sensor to the junction of said first resistor and said voltage regulating neon tube and to the control electrode of said normally nonconducting neon tube to thereby apply an operating voltage to said condition sensor, said condition sensor being effective upon being subjected to a condition to which it is sensitive to render said normally nonconductive neon tube conductive to thereby discharge said capacitor, whereupon said condition sensor is quenched.

7. Electric apparatus comprising: nonselfquenching condition sensing means of the type having a pair of electrodes disposed in an ionizable gaseous medium, a source of operating voltage having a pair of output terminals, a series connected first resistor and normally conducting neon tube connected to said output terminals to establish an intermediate potential level at the junction thereof, a series connected second resistor and capacitor connected to said output terminals, a normally nonconducting neon tube having a control electrode and a pair of main electrodes, circuit means connecting the main electrodes of said normally nonconducting neon tube to the terminals of said capacitor, the voltage present on said capacitor being insufficient to cause conduction of said normally nonconducting neon tube, a series connected third and fourth resistor connected to the terminals of said capacitor, circuit means connecting the control electrode of said neon tube to the junction of said third and fourth resistors, and further circuit means connecting the electrodes of said condition sensor to the junction of said first resistor and said normally conducting neon tube and to the control electrode of said normally nonconducting neon tube to thereby apply an operating voltage to said condition sensor, said condition sensor being effective upon being subjected to a condition to which it is sensitive to render said normally nonconductive neon tube conductive and thereby discharge said capacitor, whereupon said capacitor recharges through said second resistor and causes the voltage applied to said condition sensor to be reduced to the extinction potential thereof.

8. Electric apparatus comprising; a nonselfquenching condition sensor of the type having a pair of electrodes disposed in an ionizable gaseous medium, said condition sensor normally being nonconductive and adapted to become conductive upon being subjected to a condition to which it is sensitive, a source of voltage, a voltage divider connected to said source of voltage, circuit means connecting one electrode of said condition sensor to an intermediate point on said voltage divider, a series connected impedance and normally nonconductive controllable current conducting device connected to said source of voltage, and circuit means connecting the other electrode of said condition sensor in controlling relation to said current conducting device to apply an operating voltage to said condition sensor, said condition sensor being effective to render said current conducting device conductive upon said condition sensor being subject to a condition to which it is sensitive, to lower the voltage applied to said condition sensor and thereby quench said condition sensor.

9. Electric apparatus comprising; a nonselfquenching condition sensor of the type having an anode and a cathode disposed in an ionizable gaseous medium, said condition sensor normally being nonconductive and adapted to be rendered conductive upon being subjected to a condition to which it is sensitive, a direct current source of voltage, a voltage divider including conductive elements connected to said source of voltage, circuit means connecting the anode of said condition sensor to an intermediate point on said voltage divider to apply a positive voltage thereto, a further circuit having a normally nonconductive control device connected to said source of voltage, said control device including control means, and circuit means connecting the cathode of said condition sensor to said control means to apply a negative voltage to said cathode and to connect said condition sensor in controlling relation to said control device, said condition sensor being effective upon being subjected to a condition to which it is sensitive to render said control device conductive and to thereby alter the voltage level of said cathode and render said condition sensor inoperative to sense the condition.

References Cited in the file of this patent
UNITED STATES PATENTS

| | | |
|---|---|---|
| 2,503,730 | Hare | Apr. 11, 1950 |
| 2,606,296 | Simpson | Aug. 5, 1952 |
| 2,721,276 | Exner | Oct. 18, 1955 |
| 2,735,947 | Molloy | Feb. 21, 1956 |
| 2,833,932 | Constable et al. | May 6, 1958 |
| 2,839,688 | Anton | June 17, 1958 |